United States Patent
Ng

(10) Patent No.: US 9,081,573 B2
(45) Date of Patent: Jul. 14, 2015

(54) METHOD AND APPARATUS FOR AUTOMATICALLY REPAINTING AN EXTERNAL DISPLAY DURING TRANSITIONING TO A LOW POWER STATE

(75) Inventor: Choo Boon Ng, Penang (MY)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 13/027,650

(22) Filed: Feb. 15, 2011

(65) Prior Publication Data

US 2011/0205219 A1    Aug. 25, 2011

(51) Int. Cl.
*G06F 1/00* (2006.01)
*G06F 1/32* (2006.01)
*G06F 3/14* (2006.01)
*G09G 5/00* (2006.01)

(52) U.S. Cl.
CPC ............ *G06F 1/3265* (2013.01); *G06F 3/14* (2013.01); *G06F 3/1438* (2013.01); *G06F 3/1446* (2013.01); *G06F 3/1423* (2013.01); *G09G 5/006* (2013.01); *G09G 2330/021* (2013.01); *G09G 2330/027* (2013.01); *G09G 2370/10* (2013.01); *G09G 2370/12* (2013.01); *Y02B 60/1242* (2013.01)

(58) Field of Classification Search
CPC ........ G09G 5/00; G06F 3/1438; G06F 3/1446
See application file for complete search history.

(56) References Cited

U.S. PATENT DOCUMENTS

| | | |
|---|---|---|
| 5,757,365 A * | 5/1998 | Ho ................................ 345/212 |
| 7,366,549 B2 | 4/2008 | Lee |
| 8,026,981 B2 * | 9/2011 | Jong ............................. 348/705 |
| 8,207,974 B2 | 6/2012 | Sakariya |
| 8,238,979 B2 | 8/2012 | Rajamani |
| 2004/0075621 A1 * | 4/2004 | Shiuan et al. .................. 345/1.1 |
| 2005/0044433 A1 * | 2/2005 | Dunstan ....................... 713/320 |
| 2005/0134746 A1 * | 6/2005 | Brandt .......................... 348/705 |
| 2007/0052615 A1 * | 3/2007 | Van Dongen et al. ......... 345/1.1 |
| 2007/0099466 A1 * | 5/2007 | Gushiken ..................... 439/188 |
| 2008/0320321 A1 * | 12/2008 | Sutardja ....................... 713/323 |
| 2009/0225108 A1 * | 9/2009 | Shen ............................ 345/699 |
| 2009/0288126 A1 * | 11/2009 | Candelore et al. ............ 725/110 |
| 2010/0079444 A1 | 4/2010 | Kyriazis |

OTHER PUBLICATIONS

PCT International Search Report and Written Opinion issued in corresponding PCT/US2011/067939, dated Aug. 27, 2012 (9 pages).

* cited by examiner

*Primary Examiner* — Thomas Lee
*Assistant Examiner* — Zhipeng Wang
(74) *Attorney, Agent, or Firm* — Trop, Pruner & Hu, P.C.

(57) ABSTRACT

A computer system may include a main display and an external display coupled, for example, to the computer system through a universal serial bus digital visual interface link. In response to the detection of an indication of a suspension of the system to a reduced power consumption state, such as the S3 sleeping state, the external display may be automatically repainted. In addition, the current image layers and coordinates may be automatically stored to a frame buffer.

20 Claims, 2 Drawing Sheets

METHOD AND APPARATUS FOR AUTOMATICALLY REPAINTING AN EXTERNAL DISPLAY DURING TRANSITIONING TO A LOW POWER STATE

BACKGROUND

This relates generally to displays for computer-based devices.

Conventionally, a computer may paint an image on a display. An image may be rendered and then painted on a display by painting pixels with the appropriate colors to produce the rendered image. The image location within the frame is determined by its coordinates. The image may be created from a member of overlying image layers, each layer being successively painted on the display.

However, in some cases, a computer system may have additional displays which are coupled over a universal serial bus link. Specifically, a universal serial bus to digital visual interface link allows a number of additional displays to be controlled. These displays, called external or extended displays, may operate in a clone mode wherein they display the same information that is displayed on the main display or they may operate in an extended display mode in which they display information different from what is displayed on the main display.

DETAILED DESCRIPTION

Figure 1:
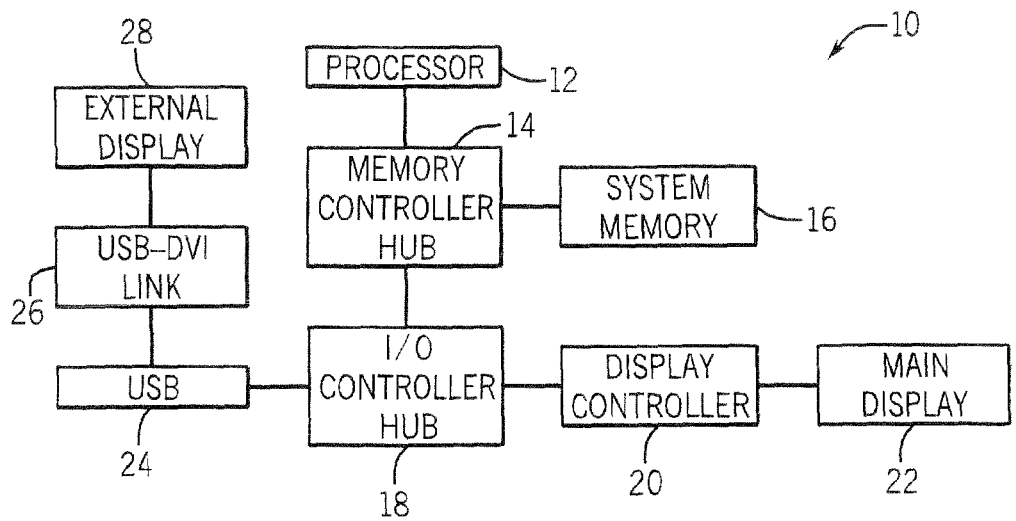
FIG. 1 is a system depiction for one embodiment.

Referring to FIG. 1, a computer system 10 may include a processor 12, coupled to a chipset, including memory controller hub 14. The memory controller hub 14 may be coupled to a system memory 16 in one embodiment. The memory controller hub 14 may also be coupled to an input/output (I/O) controller hub 18 which is also part of a chipset, in some embodiments. The controller hub 18 may control a main display 22 through a display controller 20.

Also connected to the I/O controller hub 18 may be a universal serial bus 24. It is coupled to an external or extended display 28 through a universal serial bus (USB) to digital visual interface (DVI) link 26. See Digital Visual Interface, Revision 1.0, Initial Specification, Apr. 2, 1999, available from Digital Display Working Group, Vancouver, Wash. 98683.

A digital visual interface (DVI) carries uncompressed digital video data to a display using a transition minimized differential signaling for the base electrical interconnection. A single DVI link includes four twisted pairs of wires that transmit red, green, blue, and clock.

Of course, the system architecture, shown in FIG. 1, is only one of many possible architectures. All that is needed is the universal serial bus or other connection for an external display.

In accordance with some embodiments of the present invention, when the system 10 is off or locked, the universal serial bus to digital visual interface link 26 automatically takes certain actions to control the external display 28.

Figure 2:
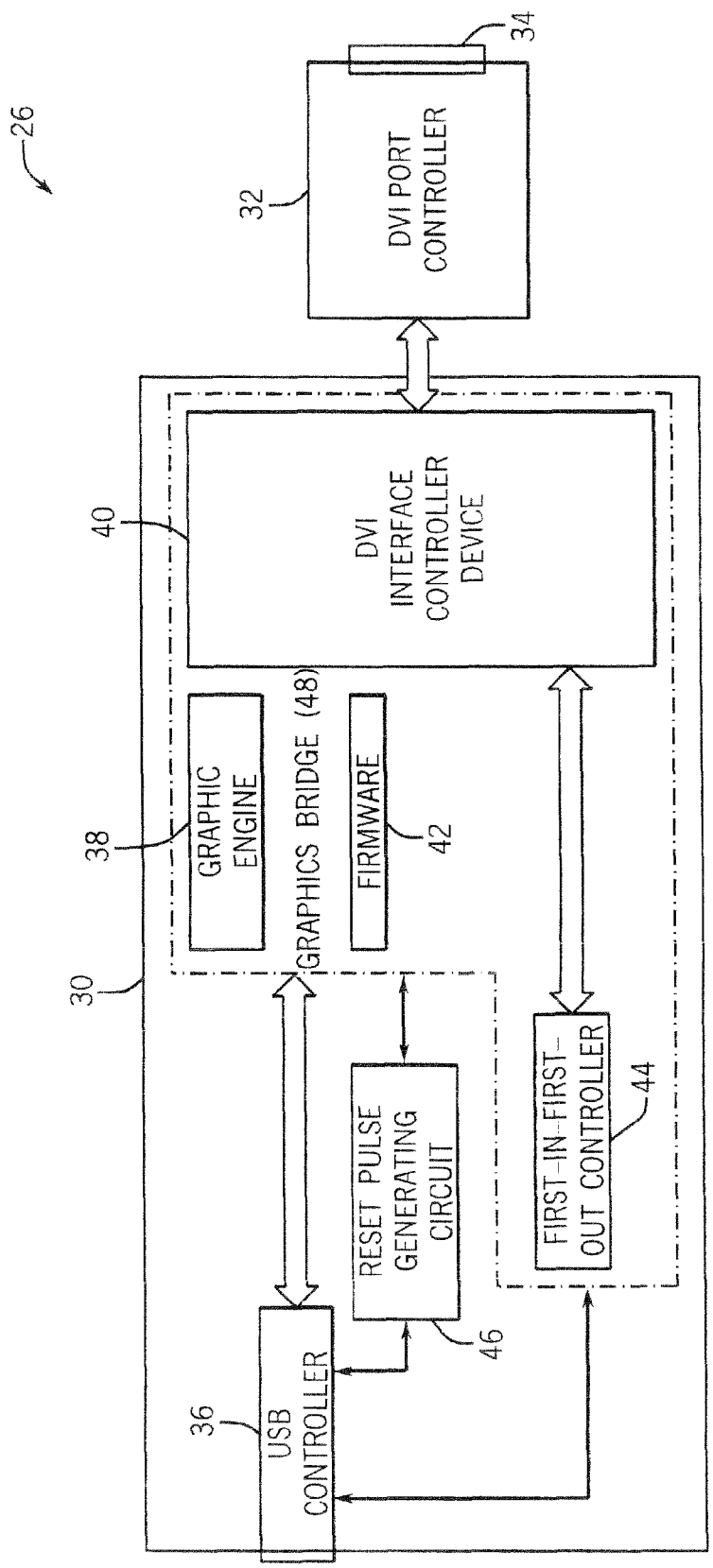
FIG. 2 is a schematic depiction of a universal serial bus to digital visual interface link in accordance with one embodiment of the present invention.

Referring to FIG. 2, the universal serial bus to digital visual interface link 26 may include a case 30, which, in turn, may include a universal serial bus controller 36 that plugs into the universal serial bus 24 (FIG. 1), in some embodiments. Thus, the controller 36 includes a USB compliant connector. See Universal Serial Bus 3.0 Specification, available from USB Implementer's Forum, Beaverton, Oreg. 97006. The universal serial bus controller 36 then couples to a graphics bridge 48 within the case 30 in one embodiment. The graphics bridge 48 optionally includes a graphics engine 38, firmware 42, a first-in, first-out controller 44, and a digital visual interface conversion device 40.

The graphics bridge 48 and universal serial bus controller 36 may also connect to a reset pulse generating circuit 46. The reset pulse generating circuit 46 detects when the system 10 is off or locked and, in response thereto, automatically repaints the external or extended display 28, shown in FIG. 1, during logon and logoff interrupts. (The system may be screen locked by pressing CTRL+ALT+DEL, which provides an interrupt). In addition, the circuit 46 may automatically store, in a frame buffer, the current coordinates and layers of a screen image displayed by active applications.

The digital visual interface conversion device 40 connects to a digital visual interface port controller 32 which may be outside the case 30. The port controller 32 includes a port connector 34 that connects to the extended or external display 28, only shown in FIG. 1. The connector 34 may be a DVI compliant connector.

In one embodiment, when the system 10 goes into the S3 sleeping power consumption state, equivalent to power being removed, the reset pulse generating circuit 26 detects the S3 state. See Advanced Configuration and Power Interface Specification version 4.0, Jun. 16, 2009. The S3 sleeping state is a low wake latency sleeping state where all system context is lost except system memory. Processor, cache, and chipset context are lost in this state. Hardware maintains memory context and restores some processor and L2 cache configuration context. Control starts from the processor's reset vector after the wake event.

The S3 signal is asserted by a chipset, such as the input/output controller hub 18 or memory controller hub 14, to indicate that the system will enter a lower power consumption state soon. The S3 signal can be monitored by the external USB-DVI link 26 to switch from normal refresh to suspended or S3 refresh mode. The S3 state is also used by other peripheral USB devices as an indication that they should isolate their inputs that are going to power off planes. Power for the USB-DVI link 26 remains on from the system 10 to enable detection of wake events during the S3 state.

Once the chipset (e.g. one of hubs 14 or 18) issues an S3 signal to the USB-DVI link 26, ideally the chipset gives the USB-DVI link 26 time to prepare to enter the suspended power consumption mode. But due to rich media in the USB-DVI link 26, often there is not enough time to complete the suspend mode process within the allotted time. So whatever applications are open may remain open, although the host system 10 has already been suspended to the S3 sleeping state.

However, the reset pulse generating circuit 46 enables the suspend mode process to continue even after the S3 state has been signaled on the system 10. Once the S3 sleep signal is asserted, the USB-DVI link 26 may maintain its power on and Windows® standard drivers may coordinate with the reset pulse generating circuit 46 to store, into the frame buffer, the layers that each application was on when the suspend was signaled and the coordinates of each of those applications. Then, the reset pulse generating circuit 46 automatically repaints the screen of the external display 28 and completes the suspend mode process. When an S3 sleep state resume occurs, whatever contents that were on the USB-DVI link at the time of the S3 suspend are resumed by recalling the coordinates and layers from the frame buffer. Thus, each application is resumed to the same state it was in at the time of the S3 suspension, with the same screen image display.

In some embodiments, a master Windows® driver toggles a reset pulse automatically to reset any uncleared graphics buffers. At the same time, the Windows® logoff frame may be overlaid on top of the previous screen. In some embodiments, this is not device specific, as it comes from within the universal serial bus to digital visual interface display link 26. This gives the system more latency for writing to the external universal serial bus, digital visual interface frame buffer compared to passing through the various components if the operations were not handled directly within the link 26.

Figure 3:
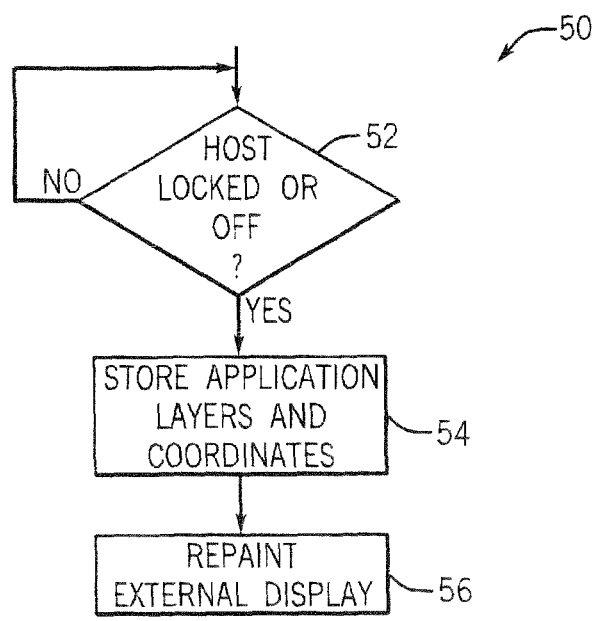
FIG. 3 is a flow chart for one embodiment of the present invention.

Thus, in accordance with some embodiments, software, firmware, or hardware may implement the sequence 50 of FIG. 3. In a software embodiment, a sequence of instructions may be executed by a processor-based device. Those instructions may be stored in a non-transitory computer readable medium such as semiconductor, magnetic, or optical memory. For example, the sequence 50 may be part of the firmware 42 stored within the graphics bridge 48. The firmware 42 may be executed by the graphics engine 38, which may be a processor-based device in some embodiments.

Thus, the sequence 50 initially determines whether the host system 10 is locked or off. As a result of the actions of the circuit 46, the external display 28 may be repainted and the application layers and application coordinates may be detected, as indicated in blocks 56 and 54, respectively, in FIG. 3.

In some embodiments, the operation described above is advantageous because, otherwise, clearing or repainting the image on the external screen, when a universal serial bus digital visual interface display link is used, requires that the user run the mouse all around the external screen or turn off power to the external screen. In some embodiments of the present invention, the user does not need to turn off the external stream or run the mouse manually to clear off or repaint the image on the external screen. The reset pulse generating circuit automatically repaints the external screen when the system is locked or powered off.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting an indication of suspension of a system to a reduced power consumption state; and
   in response to the detecting of the indication and before the transition to the reduced power consumption state has occurred, automatically repainting an external display and continuing while repainting to transition to said reduced power consumption state.

2. The method of claim 1 wherein detecting includes detecting the S3 sleeping state.

3. The method of claim 2 including extending the time to store information in response to detecting an indication of an impending S3 sleep state.

4. The method of claim 1 including automatically repainting the external display in response to an indication of an impending reduced power consumption state.

5. The method of claim 1 including automatically storing information about the coordinates and layers of an image displayed when an indication of a reduced power consumption state is received.

6. The method of claim 1 including enabling the external display coupled to a host system through a universal serial bus digital visual interface link to be repainted in response to an indication of a reduced power consumption state.

7. A non-transitory computer readable medium storing instructions executed by a processor to:
   automatically repaint an external display coupled to a computer system when the computer system is about to enter a reduced power consumption state; and
   in response to the detecting of the indication and before the transition to the reduced power consumption state has occurred, automatically repaint an external display and continuing while repainting to transition to said reduced power consumption state.

8. The medium of claim 7 further storing instructions to detect an indication of a suspension of the system to the reduced power consumption state.

9. The medium of claim 8 further storing instructions to detect the S3 sleeping state.

10. The medium of claim 8 further storing instructions to extend the time to store information in response to detecting the indication of a suspension to a reduced power consumption state.

11. The medium of claim 7 further storing instructions to automatically repaint the external display in response to an indication of an impending power consumption reduction.

12. The medium of claim 8 further storing instructions to automatically store information about the coordinates and layers of an image being displayed when an indication of a reduced power consumption state is detected.

13. The medium of claim 7 further storing instructions to enable the external display, coupled to the system through a universal serial bus digital visual interface link, to be repainted in response to an indication of a reduced power consumption state.

14. An apparatus comprising:
   a unit to couple a host computer system to an external display; and
   said unit including a circuit to automatically repaint the external display when the host is about to enter a reduced power consumption state, and in response to the detecting of the indication and before the transition to the reduced power consumption state has occurred, automatically repaint an external display and continuing while repainting to transition to said reduced power consumption state.

15. The apparatus of claim 14 wherein said unit includes a universal serial bus controller.

16. The apparatus of claim 15 wherein said apparatus includes a digital visual interface conversion device.

17. The apparatus of claim 14, said unit to detect an indication of a suspension of the host to a reduced power consumption state.

18. The apparatus of claim 17, said unit to extend the time to store information in response to detecting the indication of a suspension to a reduced power consumption state.

19. The apparatus of claim 14, said unit to repaint the external display in response to an indication of an impending power consumption reduction.

20. The apparatus of claim 17, said unit to automatically store information about the coordinates and layers of an image being displayed when an indication of a reduced power consumption state is detected.

\* \* \* \* \*